(12) United States Patent
Kobayashi et al.

(10) Patent No.: US 9,500,976 B1
(45) Date of Patent: Nov. 22, 2016

(54) METHOD OF MANUFACTURING THERMAL TRANSFER PRINT SHEET, IMAGE FORMING APPARATUS, AND METHOD FOR SAME

(71) Applicant: CASIO COMPUTER CO., LTD., Shibuya-ku, Tokyo (JP)

(72) Inventors: Masaki Kobayashi, Higashiyamato (JP); Hiroyuki Hirabayashi, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/060,579

(22) Filed: Mar. 3, 2016

(30) Foreign Application Priority Data

Jun. 23, 2015 (JP) ................................. 2015-125535

(51) Int. Cl.
| | |
|---|---|
| *G06K 15/00* | (2006.01) |
| *H04N 1/405* | (2006.01) |
| *G03G 15/01* | (2006.01) |
| *B41M 5/34* | (2006.01) |

(52) U.S. Cl.
CPC ................ *G03G 15/01* (2013.01); *B41M 5/34* (2013.01)

(58) Field of Classification Search
CPC ... G03G 15/01; B41M 5/34; H04N 1/40087; H04N 1/4057; H04N 1/6033; H04N 1/4055; H04N 1/036

USPC ............................................ 358/3.1, 1.1, 1.9
See application file for complete search history.

(56) References Cited

U.S. PATENT DOCUMENTS

| | | | |
|---|---|---|---|
| 2011/0216381 A1* | 9/2011 | Soeda ........................... | 358/518 |
| 2015/0003855 A1* | 1/2015 | Kobayashi ......... | G03G 15/5058 399/72 |

FOREIGN PATENT DOCUMENTS

JP          2011152662 A          8/2011

* cited by examiner

*Primary Examiner* — Douglas Tran
(74) *Attorney, Agent, or Firm* — Holtz, Holtz & Volek PC (57) ABSTRACT

The amount of achromatic toner used is reduced without decreasing adhesive force. A printer apparatus derives the densities of chromatic toner corresponding to the tone values of image data in the cyan, magenta and yellow format, and derives a total density by adding up the respective densities of the chromatic toner of cyan, magenta, and yellow. Then, the apparatus compares a threshold density such as 100% or 60% with the total density of the chromatic toner of cyan, magenta, and yellow. When the total density is higher than the threshold density, the apparatus sets the density of achromatic toner to 0. When the total density of the chromatic toner of cyan, magenta, and yellow is not higher than the threshold density, the apparatus sets the density of the achromatic toner to a value acquired by subtracting the total density from the threshold density.

13 Claims, 7 Drawing Sheets

METHOD OF MANUFACTURING THERMAL TRANSFER PRINT SHEET, IMAGE FORMING APPARATUS, AND METHOD FOR SAME

CROSS-REFERENCE TO RELATED APPLICATION

This application is based upon and claims the benefit of priority from the prior Japanese Patent Application No. 2015-125535, filed Jun. 23, 2015, the entire contents of which are incorporated herein by reference.

BACKGROUND OF THE INVENTION

1. Field of the Invention

The present invention relates to a method of manufacturing a thermal transfer print sheet, an image forming apparatus, and a method for same.

2. Description of the Related Art

Conventionally, as a method for printing a desired image or a design such as a logo on a transfer target medium such as a fabric product including a T-shirt, a sweat shirt, or work clothes, wood, or a metal plate, a method and an apparatus are known which create a thermal transfer print sheet by overlaying, on a release sheet, an image to be thermally transferred to a transfer target medium and an adhesive agent for bonding the image to the transfer target medium.

When an image is to be transferred to a transfer target medium such as a T-shirt, a thermal transfer print sheet is overlaid on the transfer target medium with its surface (hereinafter referred to as a front surface) where the transfer object of the thermal transfer print sheet has been overlaid opposing the transfer target medium, and heat and pressure are applied from the rear surface of the thermal transfer print sheet by using an iron or the like, whereby the image is fixed on the transfer target medium.

As one of methods for creating the above-described thermal transfer print sheet, there has been proposed a technique of creating a thermal transfer print sheet by overlaying the following three types of layers on a release sheet (for example, Japanese Patent Application Laid-Open (Kokai) Publication No. 2011-152662). In this technique, first, a color toner (C, M, Y toner; hereinafter referred to as a chromatic toner) layer serving as a transfer image to be thermally transferred and a transparent toner (hereinafter referred to as achromatic toner) layer for expressing white areas in the image are formed on a release sheet. Next, a mount, on which an adhesive agent layer such as a white urethane layer different from the release sheet is formed, is overlaid on the release sheet such that the surface of the adhesive agent layer is opposed to the chromatic toner layer and the achromatic toner layer on the release sheet. Then, heat and pressure are applied on the mount so as to transfer the adhesive agent layer to the chromatic toner layer and the achromatic toner layer on the release sheet.

As the above-described adhesive agent layer, a white urethane layer or the like is used to have not only the effect of bonding a transfer image to be thermally transferred to a transfer target medium such as a T-shirt but also the effect of preventing the background color of the transfer target medium from being transmitted through the thermally transferred transfer image from below and affecting the transfer image. Also, an achromatic toner layer is formed on areas in the transfer image which are to be expressed as white areas, and an adhesive agent layer such as a white urethane layer is transferred to and overlaid on the achromatic toner layer, whereby the color "white" is actualized.

If achromatic toner is transferred at a concentration (density) of 100% to chromatic (C, M, Y) areas and areas in an image which are to be expressed as white areas, a large amount of achromatic toner is consumed. Also, if achromatic toner is transferred to only areas in an image which are to be expressed as white areas without transferring any achromatic toner to chromatic toner (C, M, Y) areas, no adhesive agent layer is transferred to toner layers in areas where the densities of the chromatic toner (C, M, Y) are low. In this case, when the image is thermally transferred to a transfer target medium such as a T-shirt, part of the image is sometimes not transferred and is omitted, or the transferred image is easily removed by washing or friction.

SUMMARY OF THE INVENTION

In accordance with one aspect of the present invention, there is provided a method for manufacturing a thermal transfer print sheet, comprising: a first derivation step of deriving a printing density at which chromatic toner corresponding to each color component is printed based on tone data of each color component; a second derivation step of deriving a total density by adding up the printing density derived in the first derivation step and printing densities of chromatic toner corresponding to other color components for respective coordinates; and a third derivation step of deriving a printing density of achromatic toner that is printed on the coordinates when the total density derived in the second derivation step is less than a predetermined threshold density, wherein the third derivation step derives the printing density of the achromatic toner such that a value acquired by adding the printing density of the achromatic toner to the total density becomes equal to the threshold density.

In accordance with another aspect of the present invention, there is provided an image forming apparatus for manufacturing a thermal transfer print sheet, comprising: a first derivation section which derives a printing density at which chromatic toner corresponding to each color component is printed based on tone data of each color component; a second derivation section which derives a total density by adding up the printing density derived by the first derivation section and printing densities of chromatic toner corresponding to other color components for respective coordinates; and a third derivation section which derives a printing density of achromatic toner that is printed on the coordinates when the total density derived by the second derivation section is less than a predetermined threshold density, wherein the third derivation section derives the printing density of the achromatic toner such that a value acquired by adding the printing density of the achromatic toner to the total density becomes equal to the threshold density.

In accordance with another aspect of the present invention, there is provided a method for deriving printing densities of toner to be printed on a thermal transfer print sheet, comprising: a first derivation step of deriving a printing density at which chromatic toner corresponding to each color component is printed based on tone data of each color component a second derivation step of deriving a total density by adding up the printing density derived in the first derivation step and printing densities of chromatic toner corresponding to other color components for respective coordinates; and a third derivation step of deriving a printing density of achromatic toner that is printed on the coordinates when the total density derived in the second derivation step is less than a predetermined threshold density, wherein the third derivation step derives the printing density of the achromatic toner such that a value acquired by adding the printing density of the achromatic toner to the total density becomes equal to the threshold density.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

DETAILED DESCRIPTION OF THE PREFERRED EMBODIMENT

An embodiment of the present invention will hereinafter be described with reference to the drawings.

Figure 1:
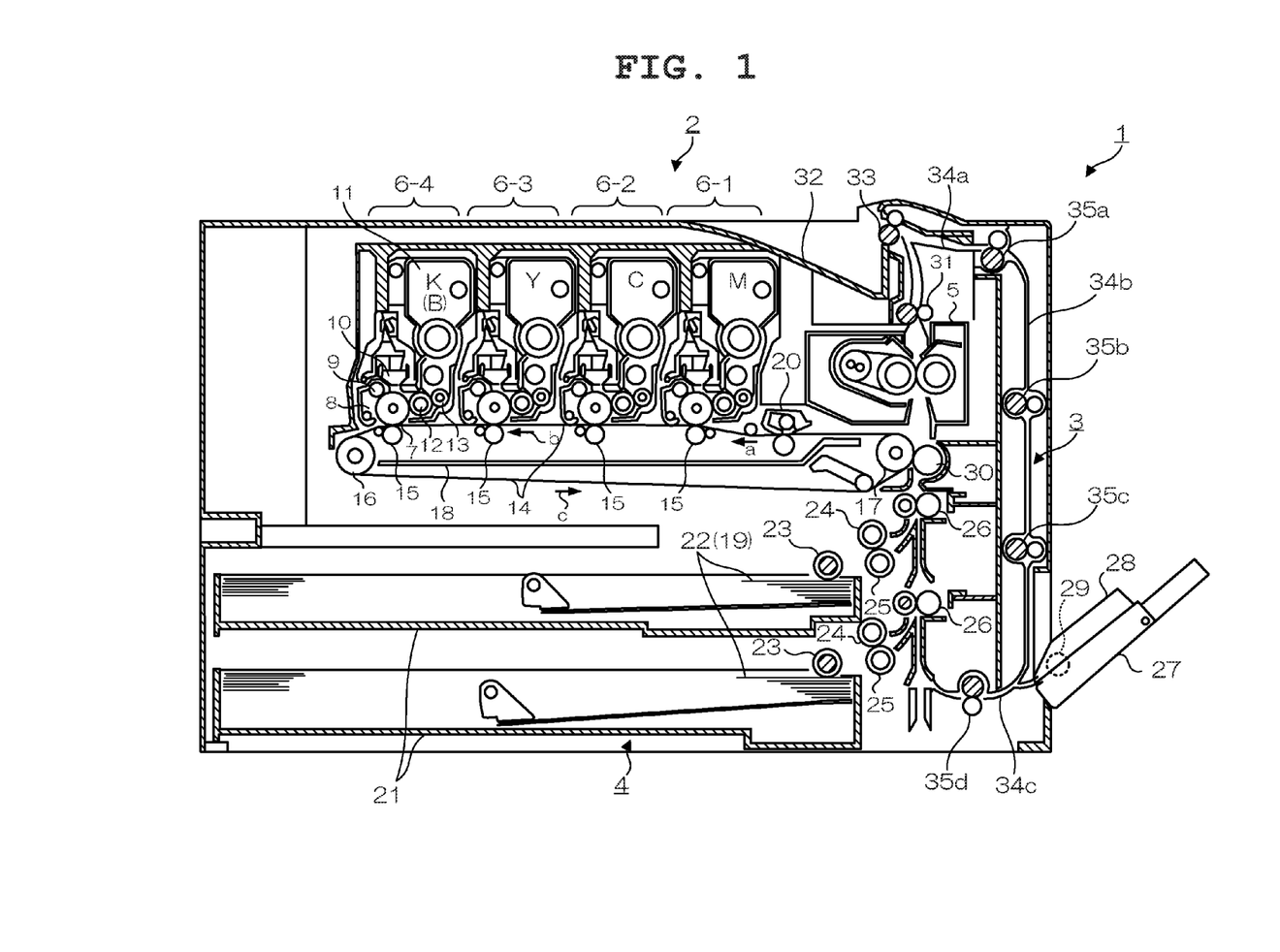
FIG. 1 is a cross-sectional view showing the internal structure of an image forming apparatus 1 according to an embodiment of the present invention.

FIG. 1 is a cross-sectional view showing the internal structure of an image forming apparatus 1 according to an embodiment of the present invention. The image forming apparatus 1 of the present embodiment in FIG. 1 has adopted a method of transferring toner images to an intermediate transfer belt and secondarily transferring the toner images to paper vertically conveyed to a secondary transfer section via the intermediate transfer belt. However, the present invention is not limited to this secondary transfer method, and other transfer methods may be adopted, such as a method of directly transferring toner images to paper.

The image forming apparatus 1 includes an image forming section 2, a two-sided printing conveyance unit 3, a sheet feeding section 4, and a fixing section 5. The image forming section 2 has a structure where four image forming units (developing devices) 6 (6-1, 6-2, 6-3, and 6-4) have been provided side by side in multiple stages. The three image forming units 6-1, 6-2, and 6-3 respectively form monochrome images with toner in magenta (M), cyan (C), and yellow (Y) serving as subtractive primary colors. The fourth image forming unit 6-4 subsequent to these three image forming units 6-1, 6-2, and 6-3 forms a monochrome image in black (K). The toner images in these four colors are overlaid on a sheet to form a full-color image.

The image forming units 6-1 to 6-4 respectively have the same structures except for the color and the type of a developer contained in a developing unit. Therefore, their structures will be described using the structure of the image forming unit 6-4 as an example.

The image forming unit 6 has a photosensitive drum 7 in its lowermost portion. The peripheral surface of this photosensitive drum 7 is, for example, formed of an organic photoconductive material, and a cleaner 8, a charging roller 9, an optical writing head 10, and a developing roller 12 in a developing device 11 are arranged to come in contact with or around the peripheral surface of the photosensitive drum 7.

The developing device 11 has in its upper portion a toner container containing the toner of one of magenta (M), cyan (C), yellow (Y), and black (K) indicated by M, C, Y, and K in the drawing, and has in its intermediate portion a toner replenishing mechanism oriented downward.

In addition, the developing device 11 includes the above-described developing roller 12 in a lateral opening in its lower portion, and has in its inner portion a toner agitating member, a toner supply roller 13 for supplying toner to the developing roller 12, and a doctor blade for regulating a toner layer on the developing roller 12 to a predetermined layer thickness. The optical writing head 10 on the apparatus body side is arranged near the upper surface of the photosensitive drum 7 between the charging roller 9 and the developing device 11.

Also, in an area near the lower surface of the photosensitive drum 7, an intermediate transfer belt 14 is arranged, and a primary transfer roller 15 is pressed toward the lower surface of the photosensitive drum 7 with the intermediate transfer belt 14 interposed therebetween.

The intermediate transfer belt 14 is an endless-shaped transfer belt constituted by a conductive sheet-like member made of resin containing conductive carbon or an ion conductive material and extending in a flat loop shape substantially from the left end to the right end at a center portion of the apparatus body in FIG. 1. This intermediate transfer belt 14 is stretched between a driving roller 16 and a driven roller 17, and is cyclically driven in the counter-clockwise direction in FIG. 1 by the driving roller 16 so as to cyclically move in the counterclockwise direction indicated by arrows a, b, and c in FIG. 1. A belt cleaner 20 is arranged to come in contact with the surface of this intermediate transfer belt 14, which removes waste toner from the intermediate transfer belt 14.

The photosensitive drum 7 rotates in the clockwise direction in FIG. 1. First, the peripheral surface of the photosensitive drum 7 is initialized by being uniformly charged by electric charge from the charging roller 9. Subsequently, an electrostatic latent image is formed on the peripheral surface of the photosensitive drum 7 by optical writing from the optical writing head 10 based on printing information.

Then, this electrostatic latent image is changed (developed) to a toner image using toner contained in the developing device 11 by development processing using the developing roller 12. Subsequently, the toner image developed on the peripheral surface of the photosensitive drum 7 is directly transferred (primarily transferred) to the belt surface of the intermediate transfer belt 14 by the primary transfer roller 15 along with the rotation of the photosensitive drum 7. The intermediate transfer belt 14 conveys the toner image directly transferred (primarily transferred) to the belt surface to a transfer position for the sheet 22 at which the toner image is transferred (secondarily transferred) to the sheet 22.

A belt position control mechanism 18 in FIG. 1 includes primary transfer rollers 15, and each of which is constituted by a conductive foamed sponge that is pressed against the lower circumferential surface of the photosensitive drum 7 via the intermediate transfer belt 14. This belt position control mechanism 18 rotationally moves the three primary transfer rollers 15 corresponding to the three image forming units 6-1, 6-2, and 6-3 for magenta (M), cyan (C), and yellow (Y) in the same period with hook-type support shafts as their centers. Then, the belt position control mechanism 18 rotationally moves one primary transfer roller 15 corresponding to the image forming unit 6-4 in black (K) in a rotational movement period different from the period of the three primary transfer rollers 15 so that the intermediate transfer belt 14 comes in contact with or separates from the photosensitive drum 7.

More specifically, the belt position control mechanism 18 switches the position of the intermediate transfer belt 14 to a position for a full-color mode (all the four primary transfer rollers 15 come in contact with the intermediate transfer belt 14), a position for a monochrome mode (only the primary transfer roller 15 corresponding to the image forming unit 6-4 comes in contact with the intermediate transfer belt 14), and a position for a non-transfer mode (all the four primary transfer rollers 15 separate from the intermediate transfer belt 14).

The sheet feeding section 4 includes two sheet cassettes 21 arranged in two upper and lower stages, and a large number of cut sheets 22 are stored in one or both of the sheet cassettes 21 in the sheet feeding section 4. A paper extraction roller 23, a feed roller 24, a separation roller 25, and a standby conveyance roller pair 26 are arranged near each of the sheet feed ports (on the right side in FIG. 1) of the two sheet cassettes 21.

The sheets 22 are conveyed from the sheet cassette 21 one by one by one rotation of the paper extraction roller 23, and are fed to the standby conveyance roller pair 26 via the feed roller 24 and the separation roller 25. Alternatively, when the sheet 22 has an unusual thickness or size, the sheet 22 is fed to the standby conveyance roller pair 26 via a sheet feeding roller 29 from above an MPF (Multi Paper Feeder) tray 28 mounted on an opened mounting section 27.

A secondary transfer roller 30 in FIG. 1, which comes in pressure contact with the driven roller 17 via the intermediate transfer belt 14, is arranged in the paper conveyance direction (in the vertically upward direction in FIG. 1) of the standby conveyance roller pair 26. The intermediate transfer belt 14, the driven roller 17, and the secondary transfer roller 30 form a secondary transfer section for the sheet 22.

The fixing section 5 including a belt-type thermal fixing unit is arranged on the lower flow side (on the upper side in FIG. 1) of the secondary transfer section. A conveyance roller pair 31 which conveys paper after fixing from the fixing section 5, and a paper ejection roller pair 33 which ejects the conveyed paper to a paper ejection tray 32 formed on the upper surface of the apparatus are arranged on the further lower flow side of the fixing section 5.

The two-sided printing conveyance unit 3 includes a return path branched in the right lateral direction in FIG. 1 from a conveyance path in an intermediate portion between the conveyance roller pair 31 and the paper ejection roller pair 33. This return path includes a start return path 34a, an intermediate return path 34b bent downward, an end return path 34c bent in the left lateral direction for conclusively reversing returned paper, and four return roller pairs 35a, 35b, 35c, and 35d arranged halfway in the return paths. An outlet of the end return path 34c connects to a conveyance path directed toward the standby conveyance roller pair 26 corresponding to the sheet cassette 21 in a lower area in the sheet feeding section 4.

Note that, when manufacturing a thermal transfer print sheet by using the image forming apparatus 1 described above, the toner cartridge (black (K)) in the image forming unit 6-4 is replaced with a toner cartridge containing transparent toner (hereinafter referred to as achromatic toner) (B), and a release sheet 19 is used in place of the sheet 22. Also, if the apparatus includes five or more image forming units 6, a toner cartridge containing achromatic toner (B) is mounted in addition to the C, M, Y, K toner, and the release sheet 19 is used in place of the sheet 22.

Figure 2:
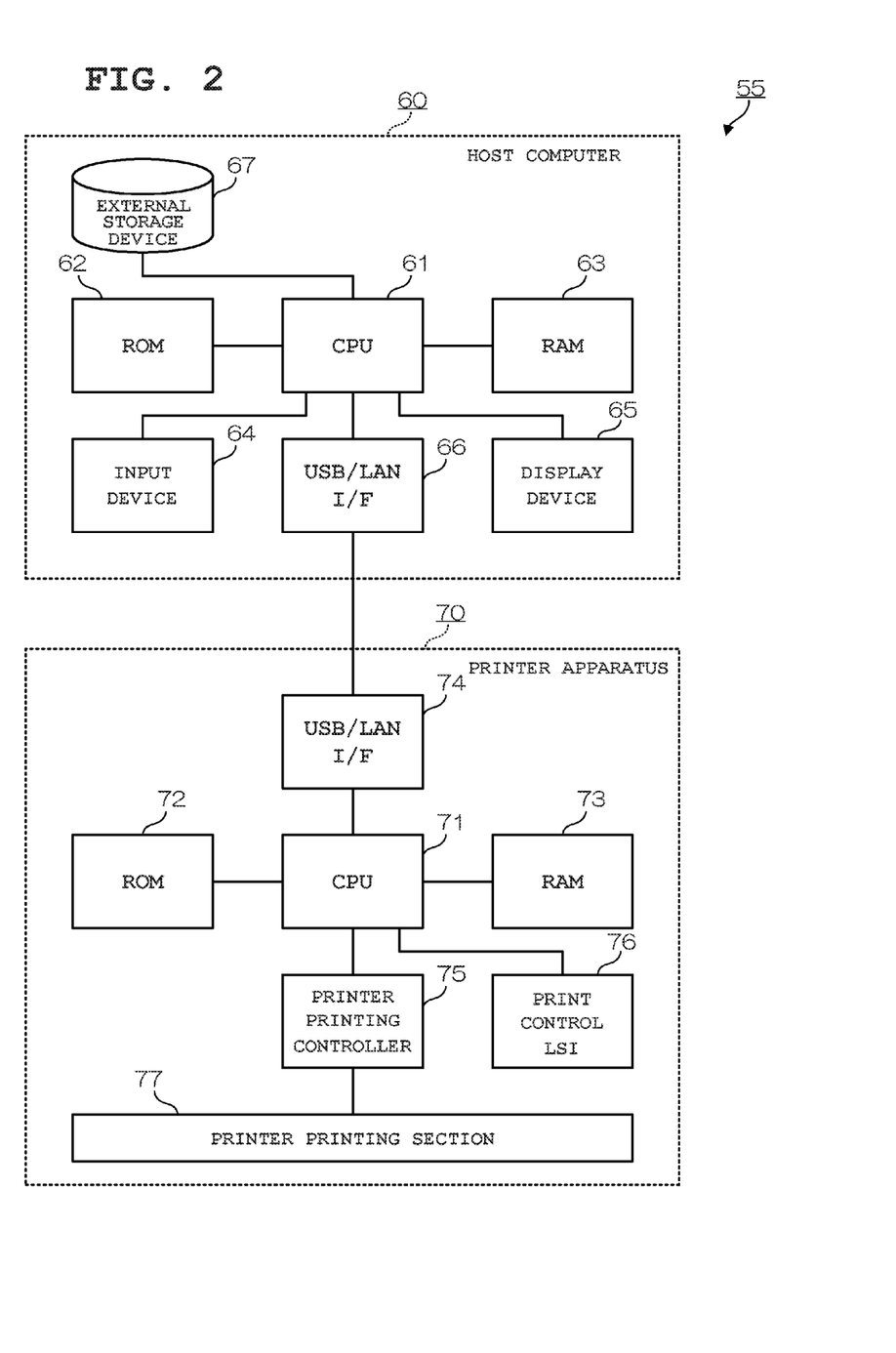
FIG. 2 is a block diagram showing the structure of a printing system 55 according to the embodiment.

FIG. 2 is a block diagram showing the structure of a printing system 55 according to the present embodiment. As shown in FIG. 2, the printing system 55 according to the embodiment includes a host computer 60 and a printer apparatus 70 that is an image forming apparatus. This host computer 60 includes a CPU (Central Processing Unit) 61, a ROM (Read Only Memory) 62, a RAM (Random Access Memory) 63, an input device 64, a display device 65, a USB (Universal Serial Bus)/LAN (Local Area Network) I/F (Interface) 66, and an external storage device 67.

The CPU 61 controls the host computer 60 in accordance with a system program, data, and an application program stored in the ROM 62. In particular, in this embodiment, when printing data created by the application program, the CPU 61 creates print data from application data by using a printer driver compatible with the printer apparatus 70, and transmits the data to the printer apparatus 70 via the USB/LAN I/F 66 described later.

The ROM 62 stores the above-described system program. The RAM 63 functions as a work area. The input device 64, for example, includes a keyboard and a mouse not shown, and transmits an operation signal inputted by the user to the CPU 61. The display device 65 includes a liquid crystal display and displays a desktop screen, operation screens for various types of applications, and the like.

The USB/LAN I/F 66 is an interface for communication (transmission of print data) with the printer apparatus 70 via a USB cable or LAN cable. The external storage device 67 is a storage device such as a hard disk storage device or a semiconductor memory, and stores an OS (Operating System), various types of application programs, various types of data, and the like.

The printer apparatus 70 includes a CPU 71, a ROM 72, a RAM 73, a USB/LAN I/F 74, a printer printing controller 75, a print control LSI 76, and a printer printing section 77. Note that the printer apparatus 70 performs printing processing based on print data supplied from the host computer 60.

The CPU 71 performs system control or the like of the printer apparatus 70 in accordance with a program and data stored in the ROM 72. The RAM 73 functions as a work area. In particular, the RAM 73 functions as a frame memory in which storage areas are respectively set for black (K), magenta (M), cyan (C), and yellow (Y). The storage area for black (K) is used as a storage area for achromatic toner (B) data when a thermal transfer print sheet is created.

The USB/LAN I/F 74 receives print data supplied from the host computer 60, and the CPU 71 converts the received print data into bitmap data and loaded into the frame memory of the RAM 73. The print control LSI 76 transfers drawing data in the RAM 73 to the printer printing section 77 via the printer printing controller 75.

The printer printing section 77, which is under the control of the printer printing controller 75, has a rotation driving system (not shown) including the photosensitive drum 7 shown in FIG. 1, the image forming section 2 including driven sections such as the charging roller 9 and the optical writing head 10, and a driving section (not shown) for driving the vertical movement of the intermediate transfer belt 14.

This printer printing section 77 supplies transfer image data in the respective colors, which are black (K), magenta (M), cyan (C), and yellow (Y), to the optical writing head 10 shown in FIG. 1 when general color printing is performed. Also, the printer printing section 77 supplies color image data in magenta (M), cyan (C), yellow (Y) and achromatic image data for achromatic toner (B) to the corresponding optical writing heads 10 shown in FIG. 1 when a thermal transfer print sheet is generated.

Also, the printer printing section 77 controls, via a developing unit 49, the formation of an electrostatic latent image on the photosensitive drum 7 by the optical writing head 10 based on color image data or achromatic image data and the developing of the formed electrostatic latent image with the corresponding chromatic toner (Y, M, C) or achromatic toner (B).

Moreover, the printer printing section 77 controls, via the fixing section 5, driving outputs for performing various types of control such as the adjustment of a voltage applied to a heat generation section incorporated in a heat roller of the fixing section 5 and the pressure force of a pressing roller for pressing the heat roller. Furthermore, the printer printing section 77 controls, via a belt driving section not shown, driving outputs for performing the vertical movement of the belt position control mechanism of the intermediate transfer belt 14 and the rotation driving of the driving roller 16 for circularly moving the intermediate transfer belt 14.

When creating a thermal transfer print sheet, the CPU 71 executes tone value derivation processing for achromatic toner (B) to acquire the toner density and tone value of the achromatic toner (B) based on image data in the respective colors, that is, magenta (M), cyan (C), and yellow (Y) stored in frame memories 731 to 733 and a threshold density described later.

A thermal transfer print sheet is created by using a release sheet for the formation of a chromatic layer serving as a transfer image to be thermally transferred and an achromatic layer for expressing white areas in the image and a mount which is different from the release sheet and on which an adhesive agent layer (a white resin layer or transparent resin layer) such as a white urethane layer has been formed. More specifically, the adhesive agent layer is transferred to the chromatic layer and the achromatic layer on the release sheet, whereby these three types of layers are overlaid on the release sheet. It is known that, in a process such as this, adhesive agent layers differ in removal easiness depending on the types of mounts having the adhesive agent layers. For this reason, a minimum necessary toner density value (100%, 60%, or the like) for a portion of a toner image formed on the release sheet 19 in which the toner density (the total density of chromatic toner and achromatic toner) becomes minimum is set in advance in accordance with the type of a mount to be used.

In this embodiment, this minimum necessary toner density is called a "threshold density". Since it is desired to reduce the amount of achromatic toner (B) to be used as much as possible, in a case where a mount is used from which an adhesive agent layer is easily removed, the threshold density is set to a low value.

For example, as the thickness of an adhesive agent layer decreases, the speed of heat transfer to the surface proportionally increases. For this reason, the fusion ratio of a portion in contact with a toner image formed on the release sheet 19 becomes high (nearly 100% of the area of the adhesive agent layer is fused to the area of the toner image). As a result, the adhesive agent layer is easily removed. Therefore, in this case, even if the area of the toner image (toner density) is comparatively small, the adhesive agent layer can be efficiently released, and accordingly the threshold density is decreased to, for example, 60%.

Alternatively, if it is known that the value of a lowest concentration portion in a transfer image is equal to or more than a predetermined value, the threshold density can be decreased.

In contrast, if an adhesive agent layer is thick or the adhesive force between a mount and an adhesive agent layer is large and therefore the adhesive agent layer is difficult to be removed, the threshold density is adjusted and set to, for example, 100% or more.

In a conventional simple method for transferring achromatic toner (B), achromatic toner (B) of a concentration (density) of 100% is transferred to the OR areas of areas in three colors of C, M, and Y regardless of the gray levels of chromatic toner (C, M, Y) transfer areas. Therefore, achromatic toner has been wasted for a portion which requires no or only a small amount of achromatic toner such as a portion with a high chromatic toner density. For this reason, a threshold density is set as a reference value for the calculation of the amount of achromatic toner (B) to be added in accordance with the densities of chromatic toner (C, M, Y).

Note that, in a case where a white resin such as white urethane is used for an adhesive agent layer as a mount having the adhesive agent layer, and the background of an image is desired to be white so as to prevent the transmission of the colors of a T-shirt, only achromatic toner (B) is used for an area of the image in which no chromatic toner (C, M, Y) is used, so that the threshold density is equal to the density of the achromatic toner (B).

In this embodiment, the density of achromatic toner (B) is derived such that the total of dot densities after screen processing with respect to the tone value of each image data becomes equal to or more than a necessary density (threshold density). This makes it possible to derive transfer amounts of chromatic toner and achromatic toner by which an adhesive agent layer on a mount is reliably fused to a necessary area while minimizing the amount of the achromatic toner (B).

Figure 3:
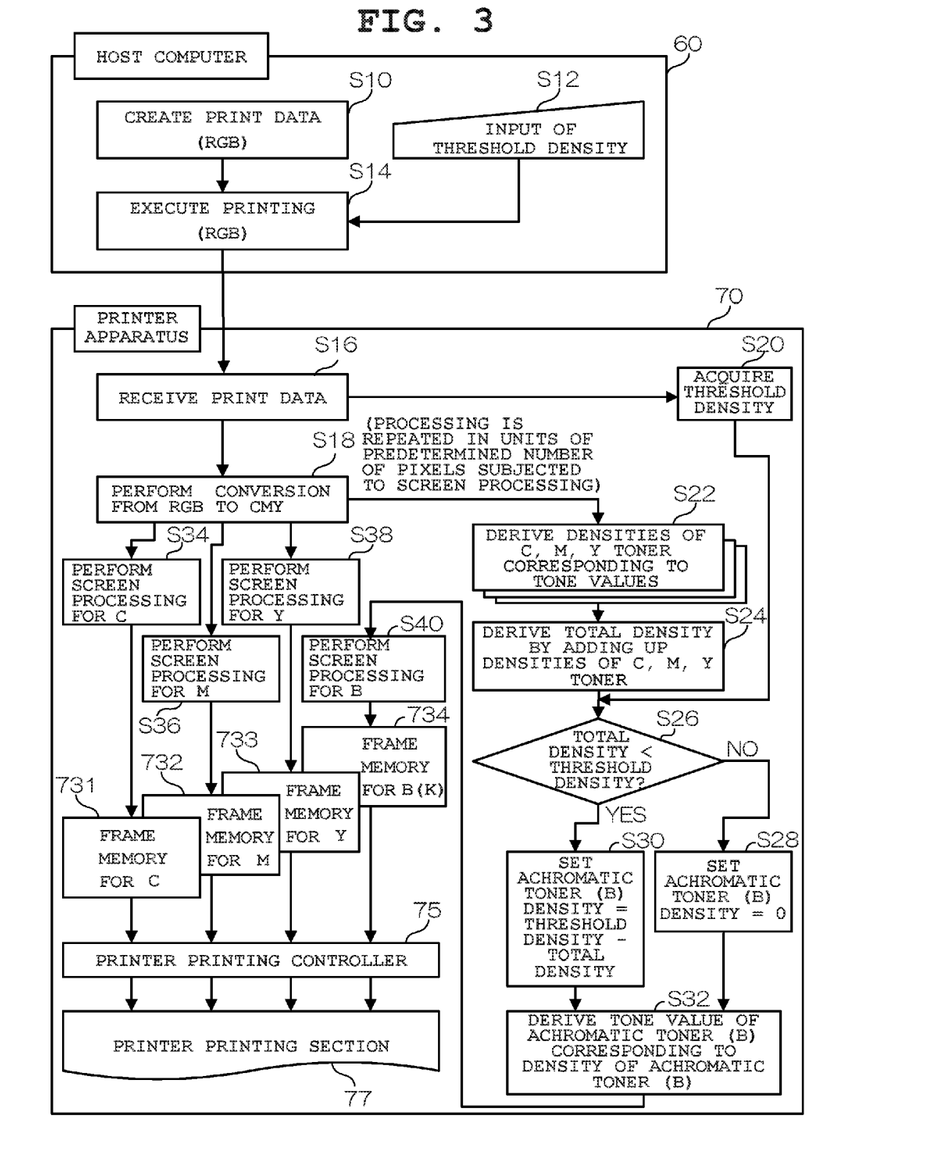
FIG. 3 is a sequence chart for explaining a procedure for deriving an achromatic toner tone value according to the embodiment.

In order to transfer toner images formed from transfer images in three colors, the CPU 71 performs screen processing (dither processing: binarization or four-valued conversion) for the tone values of the respective colors including cyan (C), magenta (M), and yellow (Y) and the tone value of the achromatic toner (B) derived by the above-described tone value derivation processing for the achromatic toner (B), and stores the respective image data as bitmap data in the frame memories 731 to 733 (refer to FIG. 3 described later).

The printer printing controller 75 outputs the image data in the respective colors including cyan (C), magenta (M), and yellow (Y) from the frame memories 731 to 733 and the image data of the achromatic toner (B) to the printer printing section 77. The printer printing section 77 sets the image forming units 6-1 to 6-4 to be in a printing state, supplies the image data in the respective colors to the optical writing heads 10 of the image forming units 6-1 to 6-3, and supplies the image data concerning the achromatic toner (B) to the optical writing head 10 of the image forming unit 6-4. Subsequently, the printer printing section 77 transfers the chromatic toner (C, M, Y) images and the achromatic toner (B) image to the release sheet 19. Then, the printer printing section 77 fixes the chromatic toner (C, M, Y) images in the respective colors and the achromatic toner (B) image transferred to the release sheet 19 by using the fixing section 5.

FIG. 3 is a sequence chart for explaining a procedure for deriving the tone value of achromatic toner (B) according to the present embodiment. First, in the host computer 60, an application creates print data (Step S10). This print data is held as R, G, and B data (each having 256 tones). Also, a threshold density (e.g., 100% or 60%) is inputted to the host computer 60 in advance (Step S12). When the application executes printing, the host computer 60 transmits the threshold density to the printer apparatus 70 together with the image data in the RGB format, via a predetermined printer driver (Step S14).

The printer apparatus 70 receives the image data in the RGB format and the threshold density from the host computer 60 (Step S16). Then, the printer apparatus 70 performs CMY conversion with respect to the received image data in the RGB format to convert them into, for example, image data in the CMY format each of which has 256 tones (Step S18). In addition, the printer apparatus 70 acquires the threshold density from the received data (Step S20).

Here, image data to be inputted to the printer apparatus 70, for example, a tone image such as a photograph has 8-bit to 12-bit multilevel data per pixel. In the printer apparatus 70, however, the number of tones that can be expressed per pixel is substantially very small. For this reason, the resolution of the printer apparatus 70 is increased to 600 dpi, 1.200 dpi, or the like and an image density is modulated in areas by using a plurality of pixels, thereby expressing a halftone image in a pseudo manner.

That is, the printer apparatus 70 implements tone expression by controlling the number of dots per unit area (density). In this embodiment, such processing (dither processing: binarization or four-valued conversion) of converting tones into a dot pattern per unit area will be referred to as screen processing. The screen processing in this embodiment is performed to convert image data into a pseudo-halftone image such that human perception to a tone expression controlled by a dot density becomes similar to human perception to the tone of an image such as a photograph.

Note that the dot densities after screen processing are not linear with respect to the tones of original image data because the densities are set in conformity with human perception. That is, a dot pattern is adjusted in conformity with human perception in accordance with characteristics such as the color development of toner to be used. For this reason, each toner density per unit area is not linear with respect to the tone of corresponding original image data. The corresponding relationship is represented by characteristic curves (refer to FIG. 4) described later in this embodiment.

Then, the printer apparatus 70 acquires the value of each toner density of chromatic toner (C, M, Y) per unit area from the tone values of the image data in the CMY format by referring to a characteristic curve (refer to FIG. 4 described later) representing the relationship between each tone value and a corresponding toner density. The characteristic curves of toner densities corresponding to tone values herein are a graph showing the relationship between the tone values of image data in the CMY format and toner densities.

Figure 4:
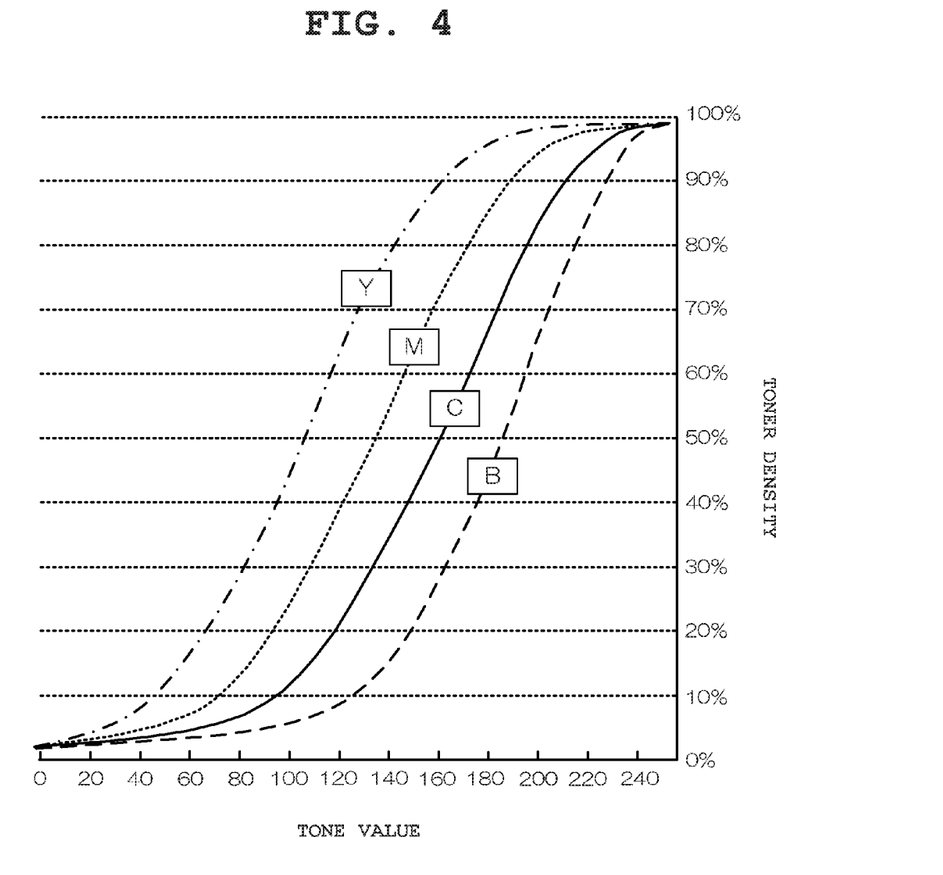
FIG. 4 is a conceptual diagram showing the relationship between the tone values of image data and actual toner densities.

FIG. 4 is a conceptual view showing the relationship between the tone values of image data and actual toner densities per unit area. As shown in FIG. 4, a characteristic curve corresponding to each of C, M, Y, and B image data shows an S-shaped curve. In the case shown in FIG. 4, the C, M, Y, and B image data show S-shaped curves following different paths. However, the characteristic curves are not always S-shaped curves. The respective characteristic curves are defined by the color development characteristics of chromatic toner (C, M, Y) to be used. For example, the curves may partially overlap, follow the same path, or have linear portions. Note that, since transparent achromatic toner (B) has no characteristic concerning color development, the characteristic curve of black toner (K) that is chromatic toner is used in place of the characteristic curve of the achromatic toner (B) shown in FIG. 4.

The printer apparatus 70 derives the respective toner densities of the chromatic toner (C, M, Y) per unit area corresponding to the tone values of the image data in the CMY format by referring to the characteristic curves shown in FIG. 4 (Step S22), and derives a total density by adding up the respective toner densities of the chromatic toner (C, M, Y) (Step S24). Subsequently, the host computer 60 of the printer apparatus 70 compares the threshold density (e.g., 100% or 60%) designated at Step S12 with the total density of the chromatic toner (C, M, Y) and judges whether the total density is higher than the threshold density (Step S26).

When the total density is higher than the threshold density (NO at Step S26), since a sufficient adhesive force can be acquired from the chromatic toner (C, M, Y) alone, the printer apparatus 70 sets the density of the achromatic toner (B) to 0 (Step S28). When the total density of the chromatic toner (C, M, Y) is higher than the threshold density (YES at Step S26), the printer apparatus 70 sets the toner density of the achromatic toner (B) to "threshold density–total density" so as to compensate for a shortage with respect to the threshold density with the achromatic toner (B) (Step S30).

After deriving the density of the achromatic toner (B), the printer apparatus 70 derives (inversely calculates) the tone value of the achromatic toner (B) corresponding to the density of the achromatic toner (B) by referring to the characteristic curve of the toner density corresponding to the tone value shown in FIG. 4 (Step S32). Note that, since the characteristic curve of the black toner (K) is used in place of the characteristic curve of the achromatic toner (B) shown in FIG. 4, it is possible to commonly control screen processing described later and processing at the time of general printing (screen processing for the black toner (K) when executing general color/monochrome printing together with the chromatic toner (C, M, Y) by using the black toner (K) in place of the achromatic toner (B)).

Then, the printer apparatus 70 performs screen processing (dither processing: binarization or four-valued conversion) based on the tone values of the chromatic toner (C, M, Y) and the tone value of the achromatic toner (B), and develops the resultant data in a form of bit map data in frame memories 731, 732, 733, and 734 of the respective colors (Step S34, Step S36, Step S38, and Step S40). Note that, when performing screen processing and bit map development in the frame memories 731, 732, 733, and 734 of the respective colors, the printer apparatus 70 develops the achromatic toner (B) by using a screen processing table for the black toner (K).

The printer printing controller 75 outputs image data (bitmap data corresponding to one page) in the frame memories 731, 732, 733, and 734 to the printer printing section 77, and the printer printing section 77 supplies the image data to the image forming units 6-1 to 6-4 to transfer and fix the images to the release sheet 19.

Figure 5:
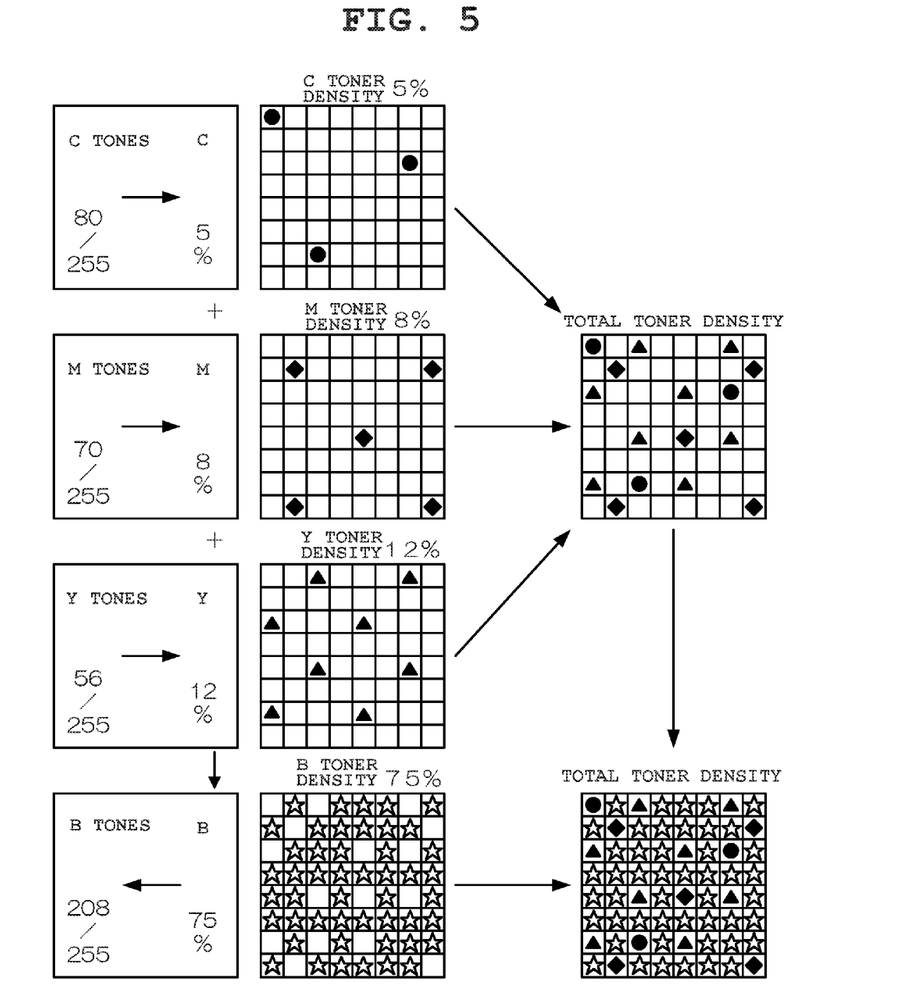
FIG. 5 is a conceptual diagram showing an example of toner amount reduction processing for acquiring the amount of achromatic toner (B) to be used in the embodiment.

FIG. 5 is a conceptual view showing an example of tone value derivation processing for achromatic toner (B) according to the present embodiment. Also, FIG. 6 is a conceptual view showing an example where the density and tone value of achromatic toner (B) is derived by using the characteristic curves of toner densities corresponding to tone values according to the present embodiment.

In the example, "threshold density=100%" has been set as the value of the minimum total toner density (threshold density) for reliable welding of an adhesive agent layer such as white urethane layer (without decreasing adhesive force with respect to a T-shirt) and a maximum reduction in the amount of achromatic toner (B) to be used. Also, the tone values of a specific portion of original image data are "cyan (C)=80, magenta (M)=70, and yellow (Y)=56" (each value corresponding to a value in the range of 256 tones (0 to 255)). When toner densities after screen processing of these tone values in cyan (C), magenta (M), and yellow (Y) are respectively calculated from the characteristic curves as shown in FIG. 6, "cyan (C)=5%, magenta (M)=8%, and yellow (Y)=12%" are acquired. FIG. 5 schematically shows these toner densities in dot patterns with cyan (C) as "•", magenta (M) as "♦", and yellow (Y) as "▲".

When the total of the toner densities of cyan (C), magenta (M), and yellow (Y) is calculated, "5+8+12=25%" is acquired. These toner densities are schematically expressed by a combination of "•" representing cyan (C), "♦" representing magenta (M), and "▲" representing yellow (Y). The difference (75%) between the total density (25%) and the threshold density (100%) is the density of the achromatic toner (B). When these toner densities are schematically expressed by dot patterns, the achromatic toner (B) is represented by "☆", as shown in FIG. 5. That is, combining all the toner densities of cyan (C), magenta (M), and yellow (Y) and the toner density of the achromatic toner (B) results in a density of 100%, which is covering all the pixels and satisfying the condition of the threshold density (100%), as schematically shown in FIG. 5.

Figure 6:
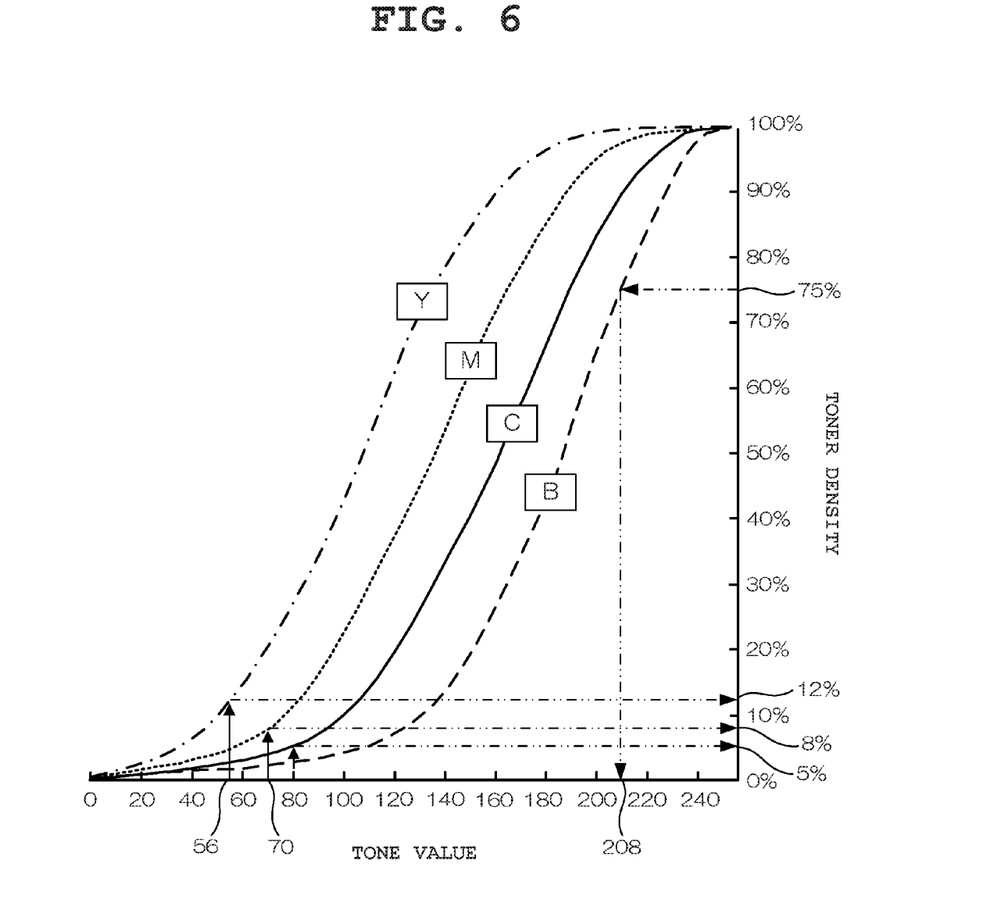
FIG. 6 is a conceptual diagram showing an example where toner densities and tone values are derived by using characteristic curves of toner densities corresponding to tone values in the embodiment.

Therefore, when the tone value of the achromatic toner (B) that makes the toner density of the achromatic toner (B) become 75% is calculated from the characteristic curve for the achromatic toner (B) as shown in FIG. 6, "208" is acquired as the tone value of the achromatic toner (B). Accordingly, when the tone values are "cyan (C)=80, magenta (M)=70, and yellow (Y)=56", it is derived that, by the tone value of the achromatic toner (B) being set to 208, the amount of achromatic toner (B) to be used can be minimized without decreasing the adhesive force with respect to a T-shirt.

Note that the dot patterns shown in FIG. 5 are merely a conceptual view, and cyan (C), magenta (M), and yellow (Y) dots may overlap each other.

Figure 7:
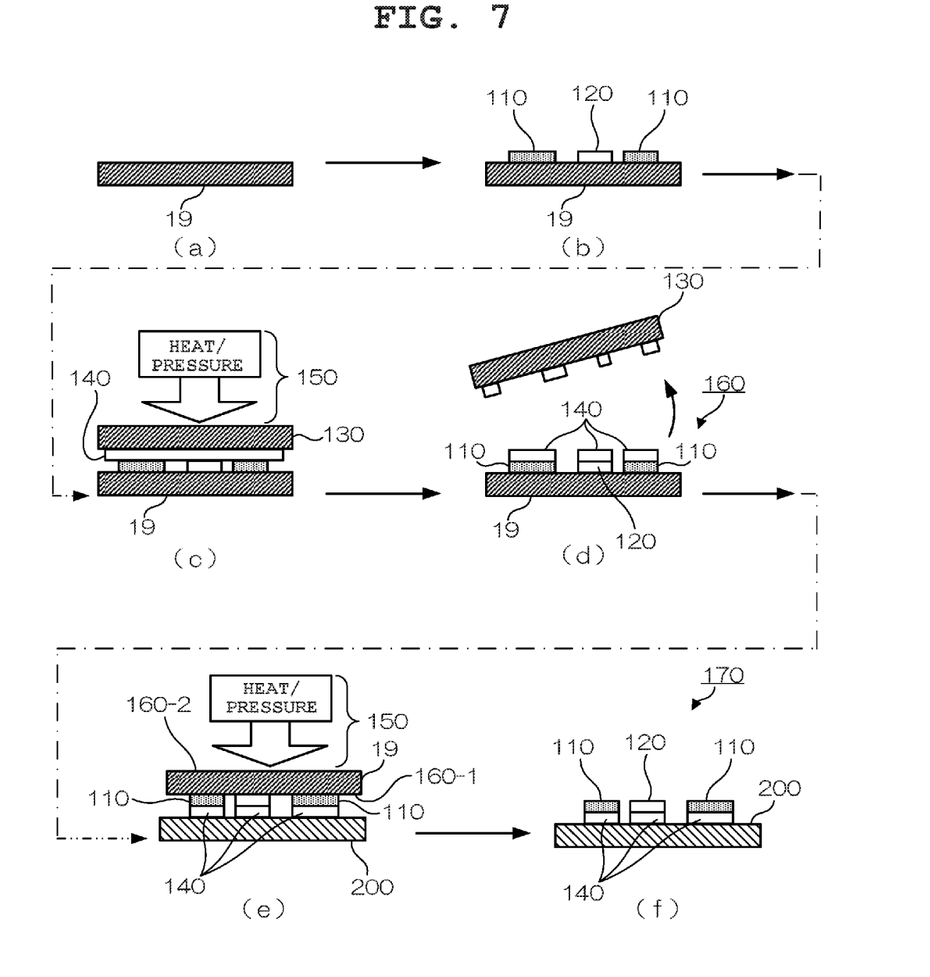
FIG. 7 is a sequence chart for explaining a procedure for creating a thermal transfer print sheet and a procedure for creating a transfer image 170 on a transfer target medium 200 such as a T-shirt in the embodiment.

FIG. 7 is a schematic view for explaining a process of creating a thermal transfer print sheet according to this embodiment. In process (a), the release sheet 19 is prepared. In process (b), chromatic toner images (Y, M, C) 110 as transfer images to be transferred and printed to a transfer target medium such as a T-shirt and an achromatic toner image (B) 120 are transferred to the release sheet 19. Here, the toner amount of the achromatic image (B) 120 is a value corresponding to the tone value (120) of the achromatic toner image (B) derived by the above-described processing.

In process (c), a mount 130 on which an adhesive agent layer (white resin layer or transparent resin layer) 140 such as a white urethane layer has been formed is overlaid on the release sheet 19 such that the surface of the adhesive agent layer 140 is opposed to the chromatic toner images 110 and the achromatic toner image 120 on the release sheet 19, and the adhesive agent layer 140 is pressed and heated by a heating press machine 150, whereby the adhesive agent layer 140 is transferred to the chromatic toner images 110 and the achromatic toner image 120 on the release sheet 19.

Subsequently, when the mount 130 is removed as indicated by process (d), the adhesive agent layer 140 is removed from only portions corresponding to the chromatic toner images 110 and the achromatic toner image 120. As a result, a thermal transfer print sheet 160 is created in which the chromatic toner images 110, the achromatic toner image 120, and the adhesive agent layer 140 are sequentially overlaid on the release sheet 19.

When the chromatic toner images 110 is to be transferred to a transfer target medium 200 such as a T-shirt as indicated by process (e), the above-described thermal transfer print sheet 160 is overlaid on the transfer target medium 200 such as a T-shirt such that a mirror image formation surface 160-1 is opposed to the transfer target medium 200, and heat and pressure are applied onto the rear surface 160-2 of the mirror image formation surface of the thermal transfer print sheet 160 by using the heating press machine 150, whereby the chromatic toner images 110 and the achromatic toner image 120 of the image to be transferred and printed are bonded to the transfer target medium 200 via the adhesive agent layer 140.

Note that the toner images may be bonded to the transfer target medium 200 by manual ironing without using the heating press machine 150.

When the release sheet 19 is manually removed after the thermal transfer print sheet 160 is cooled down to approximately room temperature, the transfer image 170 which has the chromatic toner images 110 of the image to be transferred and printed as normal images is created on the transfer target medium 200 that is a print target object such as a T-shirt, as shown in process (f).

According to the embodiment described above, the respective densities of chromatic toner (C, M, Y) corresponding to the tone values of image data in the CMY format are derived, and added up to derive a total density. Subsequently, a threshold density (e.g., 100% or 60%) is compared with the total density of the chromatic toner (C, M, Y). Then, the density of achromatic toner (B) is derived such that a value acquired by adding the density of the achromatic toner (B) to the total density is equal to the threshold density. As a result of this configuration, the amount of achromatic toner (B) to be used can be reduced with a sufficient adhesive force being ensured.

Also, according to the above-described embodiment, a "threshold density" that is a minimum necessary toner density is set in accordance with the type of mount 130 having an adhesive agent layer (white resin layer or transparent resin layer) such as a white urethane layer. As a result of this configuration, it is possible to reduce the amount of achromatic toner (B) to be used while ensuring a sufficient adhesive force, in accordance with the transfer performance of the adhesive agent layer.

Moreover, according to the above-described embodiment, the densities of chromatic toner after printing are derived by referring to characteristic curves representing the correspondence relationships between the tone values of image data and toner densities after printing of the image data As a result of this configuration, more practical toner densities can be derived, which makes it possible to reduce the amount of achromatic toner (B) to be used while ensuring a sufficient adhesive force.

Furthermore, according to the above-described embodiment, the tone data (tone value) of achromatic toner (B) is derived (inversely calculated) from the density of the achromatic toner (B) by referring to characteristic curves representing the correspondence relationships between the tone values of image data and toner densities after printing of the image data. Subsequently, print data is created by performing screen processing for tone value data of each of the color components of chromatic toner (C, M, Y) and the tone value data of the achromatic toner (B). Then, the chromatic toner (C, M, Y) and the achromatic toner (B) are printed on the release sheet 19 based on the created print data. As a result of this configuration, it is possible to reduce the amount of achromatic toner (B) to be used while ensuring a sufficient adhesive force.

In the above-described embodiment, a threshold density is set in accordance with the type of mount (e.g., the thickness of an adhesive agent layer, the adhesive force between the mount and the adhesive agent layer, and information indicating whether the value of a lowest-density portion in a transfer image is equal to or more than a predetermined value). However, the present invention is not limited thereto, and a value inversely proportional to the value of the lowest-density portion may be automatically set.

In addition, in the example of the above-described embodiment, a white urethane layer is used as an adhesive agent layer. However, an adhesive agent layer may be another type of white resin layer. Alternatively, when the surface color of the transfer target medium 200 such as a T-shirt is a light color such as white, a transparent resin layer may be used.

While the present invention has been described with reference to the preferred embodiments, it is intended that the invention be not limited by any of the details of the description therein but includes all the embodiments which fall within the scope of the appended claims.

What is claimed is:

1. A method for manufacturing a thermal transfer print sheet, comprising:
   a first derivation step of deriving a printing density at which chromatic toner corresponding to each color component is printed based on tone data of each color component;
   a second derivation step of deriving a total density by adding up the printing density derived in the first derivation step and printing densities of chromatic toner corresponding to other color components for respective coordinates; and
   a third derivation step of deriving a printing density of achromatic toner that is printed on the coordinates when the total density derived in the second derivation step is less than a predetermined threshold density,
   wherein the third derivation step derives the printing density of the achromatic toner such that a value acquired by adding the printing density of the achromatic toner to the total density becomes equal to the threshold density.

2. The method according to claim 1, wherein the threshold density is set to a value corresponding to a type of a second sheet for transferring a color layer to the chromatic toner and the achromatic toner printed on a first sheet.

3. The method according to 2, further comprising:
   a fourth derivation step of deriving tone data of the achromatic toner based on the printing density of the achromatic toner derived in the third derivation step;
   a screen processing step of creating print data by performing screen processing for tone data of each color component of the chromatic toner and the tone data of the achromatic toner;
   a printing step of printing the chromatic toner and the achromatic toner on the first sheet based on the print data created in the screen processing step; and
   a transfer step of transferring the color layer provided on the second sheet to the chromatic toner and the achromatic toner printed on the first sheet.

4. The method according to claim 1, wherein the first derivation step derives the printing density at which the chromatic toner is printed based on a correspondence relationship between the tone data and the printing density.

5. The method according to claim 4, further comprising:
   a fourth derivation step of deriving tone data of the achromatic toner based on the printing density of the achromatic toner derived in the third derivation step;
   a screen processing step of creating print data by performing screen processing for tone data of each color component of the chromatic toner and the tone data of the achromatic toner;
   a printing step of printing the chromatic toner and the achromatic toner on a first sheet based on the print data created in the screen processing step; and
   a transfer step of transferring a color layer provided on a second sheet to the chromatic toner and the achromatic toner printed on the first sheet.

6. The method according to claim 1, wherein the achromatic toner is a toner which becomes transparent by pressure and heating.

7. An image forming apparatus for manufacturing a thermal transfer print sheet, comprising:
   a first derivation section which derives a printing density at which chromatic toner corresponding to each color component is printed based on tone data of each color component;
   a second derivation section which derives a total density by adding up the printing density derived by the first derivation section and printing densities of chromatic toner corresponding to other color components for respective coordinates; and
   a third derivation section which derives a printing density of achromatic toner that is printed on the coordinates when the total density derived by the second derivation section is less than a predetermined threshold density,
   wherein the third derivation section derives the printing density of the achromatic toner such that a value acquired by adding the printing density of the achromatic toner to the total density becomes equal to the threshold density.

8. The image forming apparatus according to claim 7, wherein the threshold density is set to a value corresponding to a type of a second sheet for transferring a color layer to the chromatic toner and the achromatic toner printed on a first sheet.

9. The image forming apparatus according to 8, further comprising:
   a fourth derivation section which derives tone data of the achromatic toner based on the printing density of the achromatic toner derived by the third derivation section;
   a screen processing section which creates print data by performing screen processing for tone data of each color component of the chromatic toner and the tone data of the achromatic toner; and a printing section which prints the chromatic toner and the achromatic toner on the first sheet based on the print data created by the screen processing section.

10. The image forming apparatus according to claim 7, wherein the first derivation section derives the printing density at which the chromatic toner is printed based on a correspondence relationship between the tone data and the printing density.

11. The image forming apparatus according to claim 10, further comprising:
    a fourth derivation section which derives tone data of the achromatic toner based on the printing density of the achromatic toner derived by the third derivation section;
    a screen processing section which creates print data by performing screen processing for tone data of each color component of the chromatic toner and the tone data of the achromatic toner; and
    a printing section which prints the chromatic toner and the achromatic toner on a first sheet based on the print data created by the screen processing section.

12. A method for deriving printing densities of toner to be printed on a thermal transfer print sheet, comprising:
    a first derivation step of deriving a printing density at which chromatic toner corresponding to each color component is printed based on tone data of each color component;
    a second derivation step of deriving a total density by adding up the printing density derived in the first derivation step and printing densities of chromatic toner corresponding to other color components for respective coordinates; and
    a third derivation step of deriving a printing density of achromatic toner that is printed on the coordinates when the total density derived in the second derivation step is less than a predetermined threshold density,
    wherein the third derivation step derives the printing density of the achromatic toner such that a value acquired by adding the printing density of the achromatic toner to the total density becomes equal to the threshold density.

13. The method according to claim 12, wherein the thermal transfer print sheet is manufactured by a color layer provided on a second sheet being transferred to the achromatic toner and the chromatic toner printed on a first sheet, and
    wherein the threshold density is set to a value corresponding to a type of the second sheet.

* * * * *

UNITED STATES PATENT AND TRADEMARK OFFICE
CERTIFICATE OF CORRECTION

PATENT NO. : 9,500,976 B1  
APPLICATION NO. : 15/060579  
DATED : November 22, 2016  
INVENTOR(S) : Masaki Kobayashi et al.

Page 1 of 1

It is certified that error appears in the above-identified patent and that said Letters Patent is hereby corrected as shown below:

In the Claims

Column 13, Line 63, before "2" insert --claim--.

Column 14, Line 57, before "8" insert --claim--.

Signed and Sealed this
Twenty-first Day of February, 2017

Michelle K. Lee
*Director of the United States Patent and Trademark Office*